United States Patent
Pereira et al.

(10) Patent No.: US 11,620,417 B1
(45) Date of Patent: Apr. 4, 2023

(54) USER INTERFACE FOR INTERACTIVE SKEW GROUP ANALYSIS

(71) Applicant: Cadence Design Systems, Inc., San Jose, CA (US)

(72) Inventors: Ainsley Malcolm Pereira, Huntingdon (GB); Thomas Andrew Newton, Great Cambourne (GB)

(73) Assignee: Cadence Design Systems, Inc., San Jose, CA (US)

(*) Notice: Subject to any disclaimer, the term of this patent is extended or adjusted under 35 U.S.C. 154(b) by 0 days.

(21) Appl. No.: 17/219,765

(22) Filed: Mar. 31, 2021

(51) Int. Cl.
  *G06F 30/12* (2020.01)
  *G06F 30/392* (2020.01)
  *G06F 30/396* (2020.01)

(52) U.S. Cl.
  CPC ............ *G06F 30/12* (2020.01); *G06F 30/392* (2020.01); *G06F 30/396* (2020.01)

(58) Field of Classification Search
  USPC ......................................................... 716/100
  See application file for complete search history.

(56) References Cited

U.S. PATENT DOCUMENTS

| | | | | |
|---|---|---|---|---|
| 11,354,479 | B1* | 6/2022 | Chapman | G06F 30/396 |
| 11,416,662 | B1* | 8/2022 | Armato | G06F 30/327 |
| 2017/0032059 | A1* | 2/2017 | Godthi | G06F 30/3312 |
| 2017/0300600 | A1* | 10/2017 | Viswanath | G06F 30/392 |
| 2017/0300601 | A1* | 10/2017 | Viswanath | G06F 30/327 |

* cited by examiner

*Primary Examiner* — Mohammed Alam
(74) *Attorney, Agent, or Firm* — Schwegman Lundberg & Woessner, P.A.

(57) ABSTRACT

Aspects of the present disclosure address systems, methods, and a user interface for providing interactive skew group visualizations for integrated circuit (IC) design. The method includes causing display of a user interface that includes a display of a grouped view of a clock-tree including a plurality of skew group indicators. The method further includes receiving a user selection of a skew group indicator and updating the user interface to display a detailed view of the skew group including a graphical representation of each clock sink in the skew group and corresponding timing information. The method further includes receiving a second user selection of a first clock sink and in response, the display is updated to display an indicator of a physical location of the first clock sink within the clock tree.

20 Claims, 7 Drawing Sheets

FIG. 5

USER INTERFACE FOR INTERACTIVE SKEW GROUP ANALYSIS

TECHNICAL FIELD

The present disclosure generally relates to the technical field of integrated circuit design. In particular, the present disclosure addresses systems, methods, and graphical user interfaces for interactive skew group analysis.

BACKGROUND

Electronic design automation (EDA) is a category of systems for assisting with the design of electronic systems and devices. Large, integrated circuit designs are often assembled from previously design blocks. This enables reduced turnaround times for generation of an integrated circuit. Automated design of routing connections between individual circuit elements or design blocks are also part of such EDA system operations. Clock trees are structures within a circuit design that propagate a clock signal to different elements of the circuit. Various portions of a circuit may be subject to EDA verification analysis whereby the timing of circuit elements and/or circuit blocks is analyzed to verify that the design meets constraints in order to operate at intended clock rates in an expected operating environment.

Design engineers design ICs by transforming circuit description of the ICs into geometric descriptions, called layouts. To create layouts, design engineers typically use (EDA) applications that provide sets of computer-based tools for creating, editing, and analyzing design layouts.

When designing layouts, a fundamental goal is to satisfy timing constraints of the circuit. A key component of layout design includes controlling the circuit's clock skew, or the difference between the arrival times of the clock signal at different components of the layout. Numerous factors can affect the clock skew such as variations in gate delays of clock drivers, variations in load of the clock drivers, variations in wire lengths, positions, or other clocking strategies.

Clock skew occurs when clocking signals arrive at different destination asynchronously. Ideally, the clock signals will arrive at each destination at the same time and receive the signal at the same time. However, physical limitations of circuit components such as wire length and parasitic capacitance cause propagation delays that cause the clock signals to arrive at various locations at different times. The difference between the arrival time of the clock signals between any two locations is the clock skew.

EDA applications create layouts by using geometric shapes that represent different materials and devices on ICs. For instance, EDA tools commonly use rectangular lines to represent the wire segments that interconnect the IC components. These tools also represent electronic and circuit IC components as geometric objects with varying shapes and sizes.

The IC design process entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnects between the circuit components; and (5) verification, which checks the layout to ensure that it meets design and functional requirements.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Embodiments described herein relate to electronic design automation (FDA) and to methods, computer media, and devices used for analyzing, optimizing, and creating electronic circuits. One of the many complex elements of circuit design is the generation of routing trees that convey a signal from a signal origin, or source, to a signal destination, or sink. A clock routing tree, for example, has a single source, with hundreds or thousands of destination sinks. Additionally, the design may have limits on the amount of time a signal can take to get to the further sink (e.g., a maximum arrival time) as well as limits on the differences between arrival times at various sinks and limits on the total route length for any individual branch in a tree.

In some automated clock tree synthesis (CTS) design flows, it can be useful to constrain the clustering of the clock tree based on certain properties of the circuit design (e.g., clock skew). Modification of a logical hierarchy and connectivity after CTS are manual processes that provide some benefits but consume significant designer time resources and may also cause problems with the design flow or eventual design results. In a clock tree diagram (CTD) created by the CTS, similar logic is grouped together. Having a user interface to view individual instances (e.g., clock sinks, gates, buffers, inverters) within the CTS provides greater visibility and control over the timing constraints for the CTD. Additionally, as it is possible for an instance to be grouped into more than one skew group, it becomes difficult to discern the physical location of the particular instance. Embodiments described herein allow designers to view clustered portions of the clock tree to obtain a detailed understanding of the components, locations, and timing of skew groups within a clock tree to make preferred adjustments to the clock tree.

Conventional EDA applications provide user interfaces (e.g., graphical user interfaces (GUIs)) that enable users to perform floor planning and placement in preparation of IC design layouts. The GUIs of conventional EDA applications often automatically produce clock tree diagrams that meet the various constraints of the circuit. Traditionally, a linear programming approach and a graph-based approach are implemented to generate clock tree diagrams that map various timing components of the IC design based on various timing constraints. However, both approaches require intensive computation and are difficult to adjust the timing of clock signals at a high granularity after automatic generation of the clock tree.

First, the clock tree is complicated and difficult to navigate with hundreds or thousands of discrete components. As the designs become more complex, clock trees become correspondingly more complex. Manually searching for components within the clock tree can be tedious and prone to errors.

Second, even if a component of a clock tree is identified, it is difficult to figure out the exact location of the component within the clock tree and to discern how the component affects interconnected components within the clock tree. The methods and systems described herein provide an accessible way to view both a grouped view and a physical view of skew groups within clock tree diagrams.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure address systems, methods, and an interactive user interface for providing skew group analysis for integrated circuit (IC) design. Consistent with some embodiments, the system includes a user interface (e.g., graphical user interface (GUI)) that includes a display of a clock-tree diagram comprising multiple skew groups in a grouped view. The grouped view displays a plurality of skew group indicators, the skew group indicators including a set of clock sinks. The system receives a first user selection, via the user interface, of a skew group indicator of the plurality of skew group indicators. In response to receiving the first user selection, the system updates the user interface to display a detailed view of the skew group corresponding to the skew group indicator. The detailed view of the skew group includes graphical representations of each clock sink within the skew group and timing information for each clock sink. The system may also receive a second user selection via the user interface of a first clock sink in the skew group. In response to receiving the second user selection, the system updates the user interface to display an indicator of a physical location of the first clock sink within the clock tree.

In some embodiments, the system receives a third user selection of two or more skew group indicators of the plurality of skew group indicators. In response, the system updates the user interface to display an expanded grouped view that includes a list of instances of the two or more skew groups. The list of instances may include a combination of one or more of the following: clock sinks, gates, buffers, and inverters.

By providing granular analytics for skew groups within a clock tree, the GUI described herein improves upon conventional EDA application GUIs by providing the ability to visualize clusters of clock tree components by skew time, locate the components within the physical layout of the clock tree, and make necessary updates to the clock tree having the necessary visibility to make granular and accurate adjustments.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Figure 1:
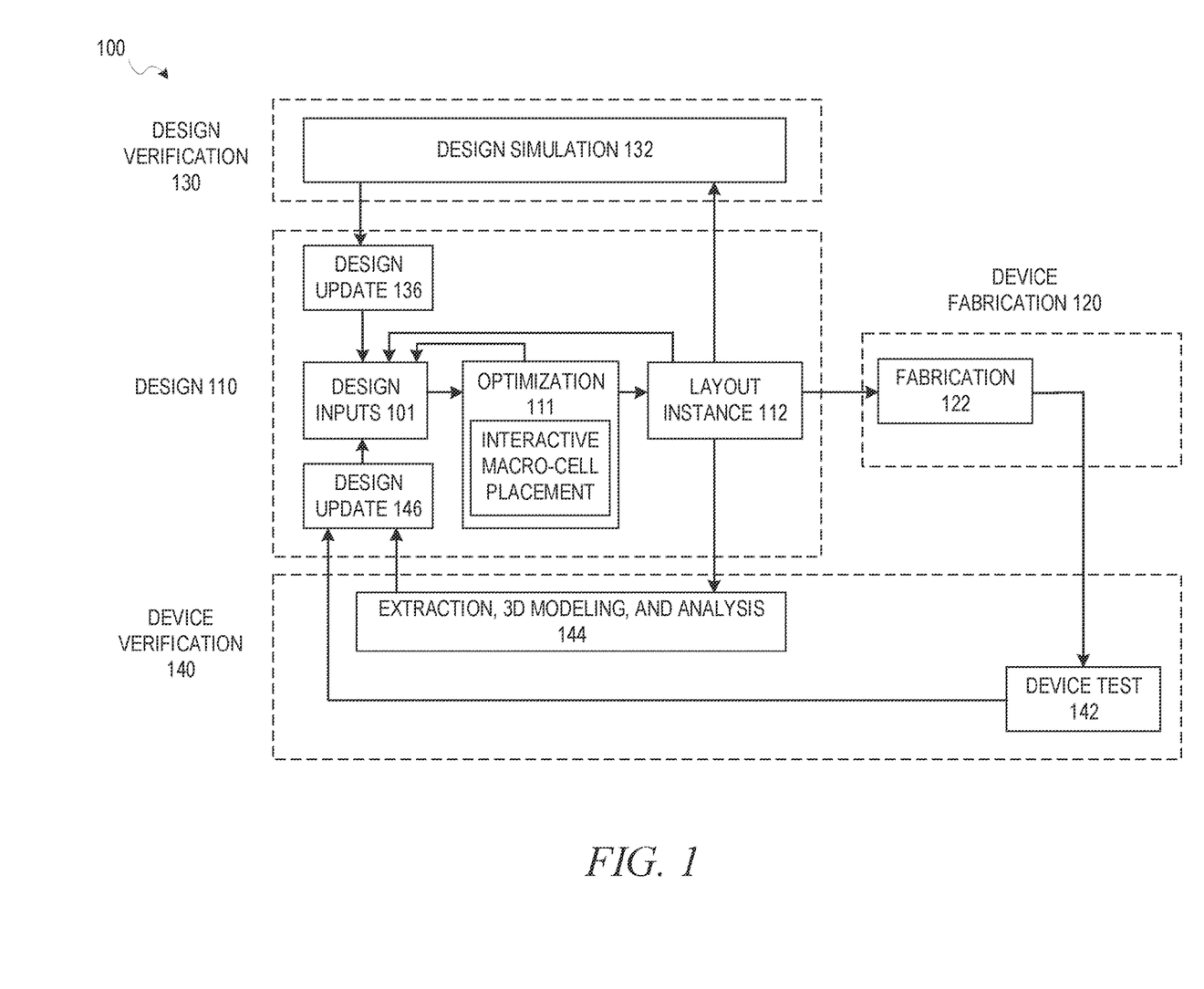
FIG. 1 is a diagram illustrating a possible design process flow for generating a circuit, according to some example embodiments.

FIG. 1 is a diagram illustrating a possible design process flow 100 for generating a circuit using interactive analysis of skew groups, according to some example embodiments. It will be apparent that the interactive skew group analysis techniques as described herein may be used with other design flows, but the design process flow 100 is described here for the purposes of illustration. As illustrated, the overall design process flow 100 includes a design phase 110, a device fabrication phase 120, a design verification phase 130, and a device verification phase 140, The design phase 110 involves an initial design input operation 101 where the basic elements and functionality of a device are determined, as well as revisions based on various analyses and optimization of a circuit design. The initial strategy, tactics, and context for the device to be created are also generated in the design input operation 101, depending on the particular design algorithm to be used.

Following an initial selection of design values in the design input operation 101, interactive skew group analysis occurs at an optimization operation 111, along with any other automated design processes. As described below, as part of the interactive skew group analysis, a GUI may be provided to display a clock tree diagram including one or more skew groups. Each skew group may be selected by a user for analysis within the clock tree diagram. For example, upon receiving a selection of a skew group indicator (e.g., grouping of clock tree components) from the clock tree diagram, the GUI may be updated to display the components of the skew group in a detailed group view delineating each component of the skew group. Additionally, indicators such as color coding can be applied to visually distinguish the selected skew group from the other skew groups of the clock tree.

After design inputs are used in the design input operation 101 to generate a circuit layout, and any optimization operations 111 are performed, a layout is generated in a layout instance 112. The layout describes the physical layout dimensions of the device that match the design inputs. This layout may then be used in a device fabrication operation 122 to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, design updates 136 from design simulation 132 operations; design updates 146 from device test 142 or extraction, 3D modeling, and analysis 144 operations; or direct design input operations 101 may occur after an initial layout instance 112 is generated. In various embodiments, whenever design inputs are used to update or change an aspect of a circuit design, an optimization operation 111 may be performed.

Figure 2:
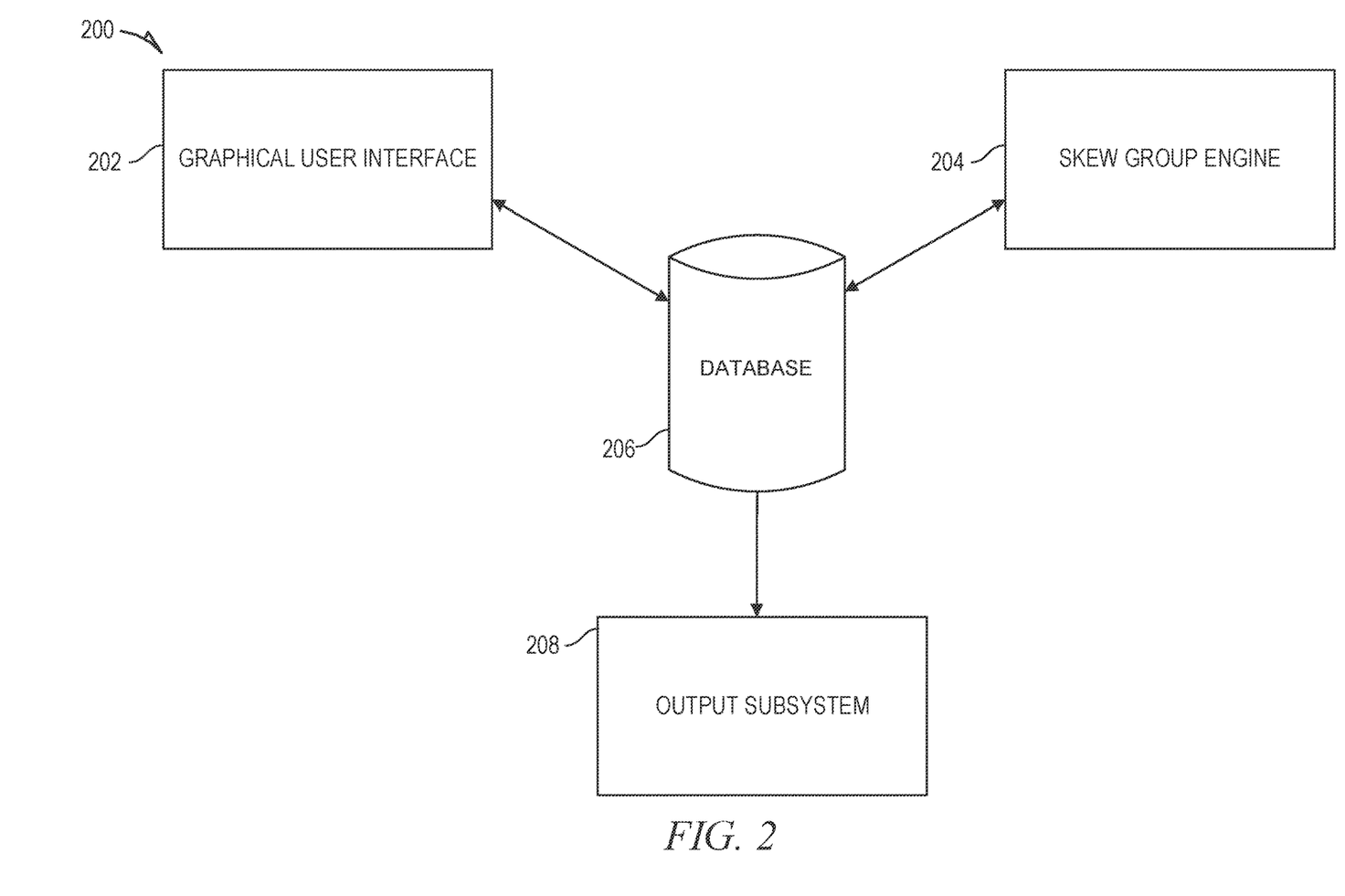
FIG. 2 is a block diagram illustrating a skew group analysis system, according to some example embodiments.

With reference to FIG. 2, a skew group analysis system 200, which may be used in the context of the interactive skew group analysis of the optimization operation 111 of the design process flow 100, is illustrated, according to some example embodiments. The skew group analysis system 200 comprises a graphical user interface (GUI) 202; a database 206; a skew group analysis engine 204; and an output subsystem 208. To avoid obscuring the inventive subject matter with unnecessary detail, various functional components that are not germane to conveying an understanding of the inventive subject matter have been omitted from FIG. 2. However, a skilled artisan will readily recognize that various additional functional components may be supported by the skew group analysis system 200 to facilitate additional functionality that is not specifically described herein.

Any one or more of the functional components illustrated in FIG. 2 and described herein may be implemented using hardware (e.g., a processor of a machine) or a combination of hardware and software. For example, any one of the components described herein may configure a processor to perform the operations described herein for that component. Moreover, any two or more of these components may be combined into a single component, and the functions described herein for a single component may be subdivided among multiple components. Furthermore, according to various example embodiments, any of the functional components illustrated in FIG. 2 may be implemented together or separately within a single machine, database, or device or may be distributed across multiple machines, databases, or devices.

The GUI 202 is responsible for displaying information to a user and handling user interactions with the skew group analysis system 200. For example, the GUI 202 may allow a user to view and edit a clock tree diagram. The GUI 202 may also include one or more elements that facilitate interactive skew group analysis within the clock tree diagram. More specifically, the GUI 202 may allow a user to select a grouping of skew groups from the clock tree diagram, and in response to the user selection, the GUI 202 may display multiple viewing configurations for the selected grouping.

The database 206 stores IC design information including design constraints in a compact and efficient manner. The output subsystem 208 outputs resulting clock tree diagrams and other useful information into files of standard and/or custom format.

The skew group engine 204 determines timing diagrams for selected circuits and displays skew groups associated with the clock tree for the selected circuits in a background process. The skew group engine 204 may employ one of many known or proprietary techniques or algorithms to determine layout options for the selected groupings. The layout options provided by the skew group engine 204 may be optimized for design constraints. For example, the skew group layout engine 204 may initially determine a generated clock tree diagram for a given selected grouping of clock tree instances (e.g., buffers, sinks, wires, drivers), group instances with similar skew times, similar locations within the clock tree, or other suitable criteria.

Figure 3A:
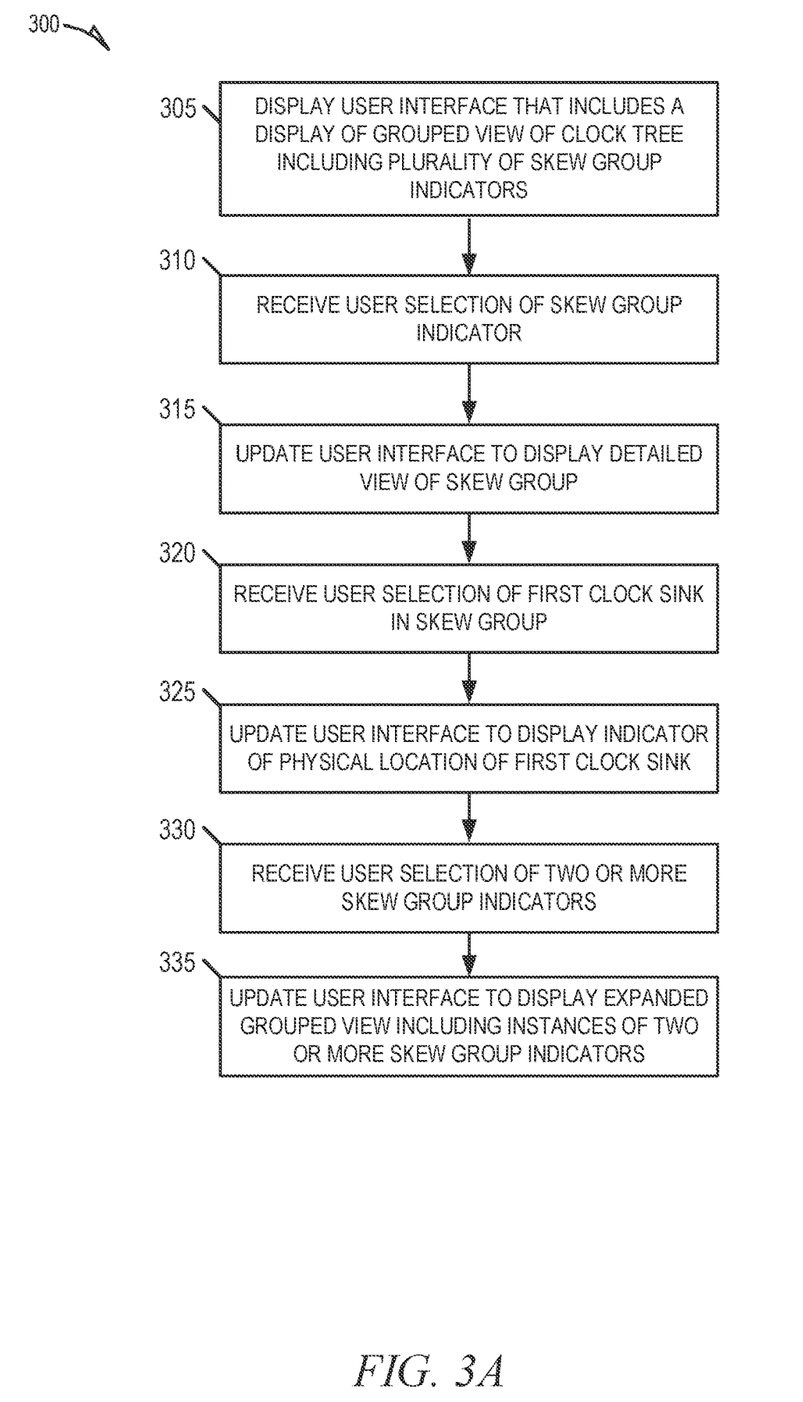
FIGS. 3A-3B are flowcharts illustrating operations of the skew group analysis system in performing a method for interactive manipulation of skew groups in a clock tree diagram, according to some example embodiments.
Figure 3B:
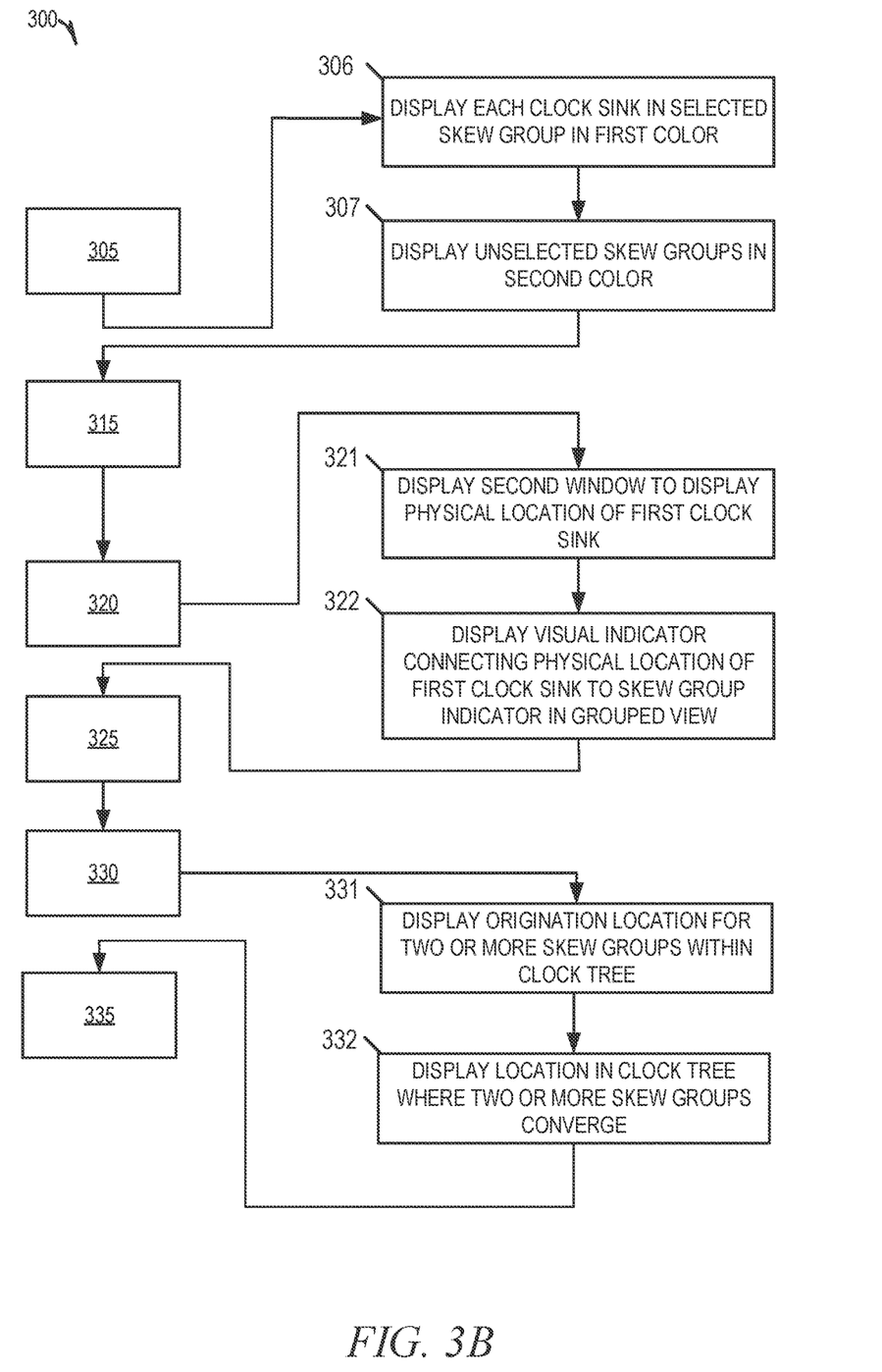

FIGS. 3A-3B are flowcharts illustrating operations of the skew group analysis system 200 in performing a method 300 for interactive placement of skew groups in a clock tree, according to some example embodiments. The method 300 may be embodied in computer-readable instructions for execution by one or more processors such that the operations of the method 300 may be performed in part or in whole by the skew group analysis system 200; accordingly, the method 300 is described below by way of example with reference thereto. However, it shall be appreciated that at least some of the operations of the method 300 may be deployed on various other hardware configurations, and the method 300 is not intended to be limited to the skew group analysis system 200. Additionally, the term "a skew group indicator" is used herein to refer to "a skew group" as skew groups comprise multiple components such as clock sinks, buffers, drivers, and a skew group indicator is representative of an indication of the skew group.

At operation 305, the skew group analysis system 200 causes display, on a display device in communication with a computer system, of a user interface (e.g., graphical user interface (GUI)) 202 that includes a display of a clock tree including a plurality of skew group indicators. The computer system may, for example, be configured (e.g., by software comprising a set of computer-readable instructions) to include one or more components of the skew group analysis system 200. The clock tree includes multiple skew groups and each skew group has a corresponding skew group indicator for reference in grouped, detailed, and physical representations in the user interface. Each skew group corresponds to one or more clock tree instances (e.g., buffer, gates, inverters, sinks, drivers, inputs) of an IC component and may be represented in the clock tree by a geometric object such as a block. Further, the geometric objects included in the display of either the clock tree and/or IC floor plan may be of various different sizes and dimensions that approximate the relative sizes of the skew groups.

The skew group analysis system 200 receives, via the GUI 202, a user selection of a skew group indicator, at operation 310. For example, a user may use an input device (e.g., a mouse) of the computer system to individually select a skew group indicator of the plurality of skew groups in the clock tree by hovering, clocking, tracing a box, or other selection mechanisms for the skew group.

The skew group analysis system 200 updates the user interface to display a detailed view of the selected skew group at operation 315. In some embodiments, the user interface is updated to display the graphical representation of each clock sink in the skew group in a first color and to display at least one of the plurality of skew group indicators in a second color.

At operation 320, the skew group analysis system 200 receives a user selection of a first clock sink in a skew group. The selected first clock sink in some embodiments, is a clock sink in the skew group selected in operation 310. From the user's perspective, the GUI 202 is updated in response to selection of the first clock sink in the skew group.

The updating of the GUI 202 may include causing display, within the GUI 202, of a separate window to present a different view of the selected first clock sink with respect to the skew group and/or also with respect to the clock tree.

Figure 4A:
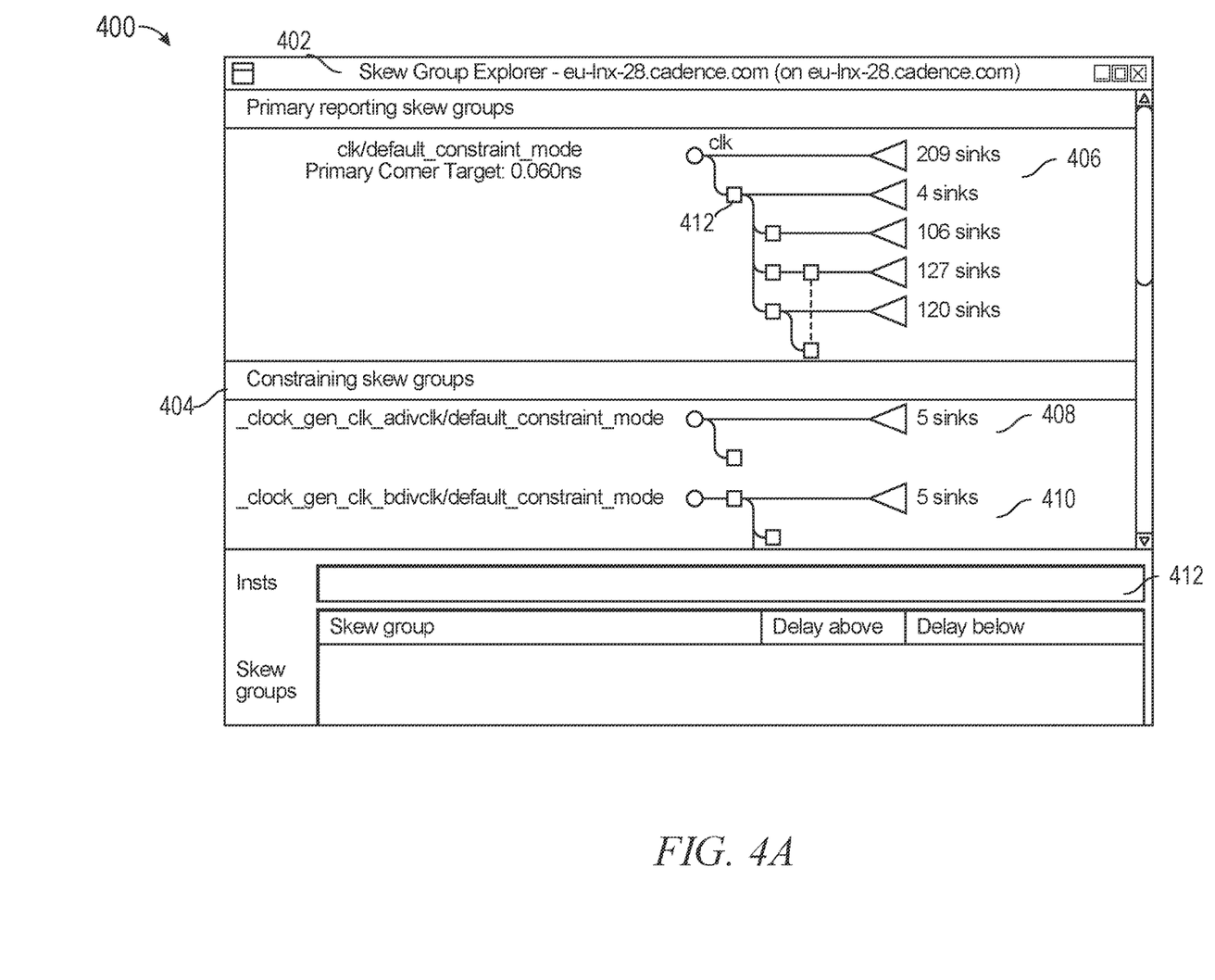
FIGS. 4A-B are interface diagrams that illustrate aspects of a graphical user interface (GUI) provided by the skew group analysis system to provide interactive analyses of skew groups, according to some example embodiments.
Figure 4B:
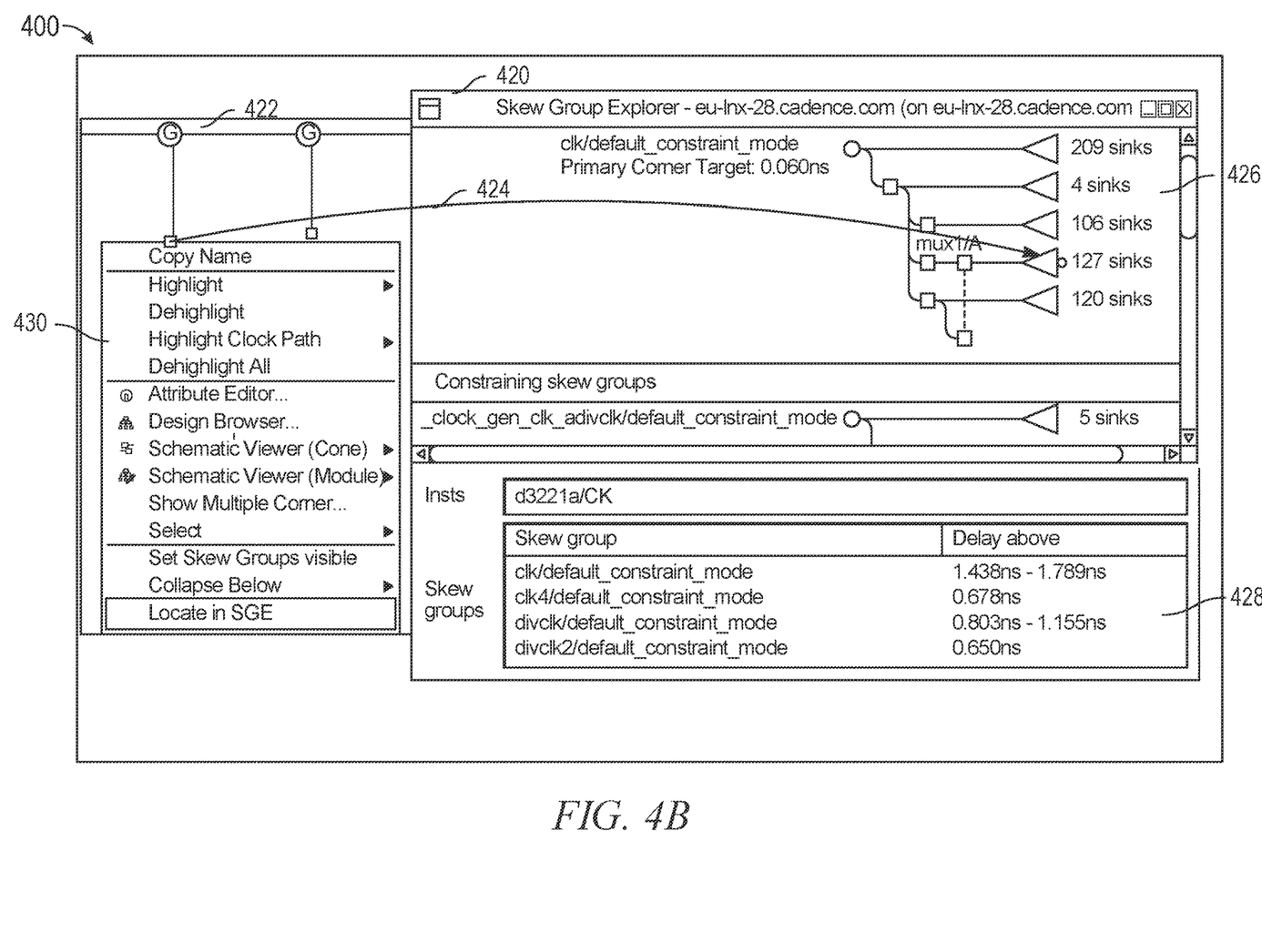

In some embodiments, the window may be segmented into multiple portions, each of which presents a layout option. In other embodiments, the window includes a curve plotted over the layout options, where each layout option is represented as a point on the curve and the layout options are displayed overlaid upon one another. Further details regarding the display of the skew group analysis system are illustrated in FIGS. 4A-4B and discussed below in reference thereto.

The skew group analysis system 200 updates, via the GUI 202, the user interface to display an indicator of a physical location of the first clock sink at operation 325. For example, a user may use an input device (e.g., a mouse) to select a first clock sink from a plurality of instances in the skew group. In some embodiments, the skew group analysis system 200 may display two or more windows displaying a grouped view and a physical locator view of the skew groups within the clock tree. In some further embodiments, the two or more displayed windows may include a visual indicator mapping a physical location of the selected first clock sink to the skew group displayed in the grouped or hierarchical view.

The skew group analysis system may receive a user selection (e.g., a third user selection) of two or more skew group indicators at operation 330. In response to receiving the third user selection of two or more skew group indicators, the skew group analysis system updates the user interface to display an expanded grouped view that includes a list of instances of two or more skew groups corresponding to the third user selection. For example, a user selection of skew groups A and B cause the user interface to display an expanded grouped view 402 of skew groups A and B as shown in FIG. 4A.

In response to receiving the user selection, the skew group analysis system 200 updates the display of the floor plan within the GUI 202 to display an expanded grouped view including the instances of two or more skew group indicators at operation 335.

As shown in FIG. 3B, the method 300 may, in some embodiments, include operations 306-307, 321-322, and 331-332. At operation 306, the skew group analysis system 200 causes display of each clock sink in the selected skew group in a first color within the GUI 202 displayed on the display device in communication with the computer system. Correspondingly, at operation 307, the skew group analysis system 200 causes display of the unselected skew groups in a second color within the GUI 202. In some embodiments, the selected skew group is displayed in a first color (e.g., red) and may also be displayed in a different font or marking to visually distinguish the selected skew group for the unselected skew groups. In some embodiments, the unselected skew groups may be displayed in the second color, the second color being an initial color displayed on the display prior to selection of the skew group. Additionally, the GUI display may also include interactive elements (e.g., buttons, sliders, dials, etc.) that enable a user to adjust the visual indicators between the selected and unselected skew groups.

As shown, the operations 321 and 322 may, in some embodiments, be performed subsequent to operation 320 where the skew group analysis system 200 receives the user selection of the first clock sink in a skew group in the clock tree. Accordingly, the skew group analysis system 200 may cause display of a second window to display a physical location of the first clock sink. In some embodiments, the user interface is displayed in a first display window and the skew group analysis system 200 causes display of a second display window that displays a physical location of the first clock sink within the clock-tree. In some embodiments, the first display window and the second display window are presented adjacent to each other within the display.

The operation 321 is not limited to being performed subsequent to the operation 320 and may, for example, instead be performed subsequent to the operation 305 where the skew group analysis system 200 causes display of the GUI 202. Accordingly, the second window may be displayed in response to user selection of a corresponding interactive element (e.g., button) presented within the GUI 202 prior to the user selection of the first clock sink.

At operation 322, the skew group analysis system 200 displays a visual indicator (e.g., an arrow) connecting a representation of a physical location of the first clock sink to the skew group indicator in the grouped view. As described above, various views showing a grouped view, detailed view, and physical representations of skew groups are available for interaction through the GUI on the display.

The operations 331 and 332 may, in some embodiments, be performed subsequent to or as part (e.g., as a subroutine or precursor task) of the operation 330 where the skew group analysis system 200 receives a user selection of two or more skew group indicators. The skew group analysis system 200, at operation 331, displays an origination location for two or more skew groups within the clock tree. Correspondingly, the skew group analysis system 200 at operation 332 displays a convergence location where the two or more selected skew groups converge within the clock tree.

FIGS. 4A-43 are interface diagrams that illustrate aspects of a user interface (e.g., GUI 400) provided by the skew group analysis system 200 to provide interactive manipulation of skew groups, according to some example embodiments. The GUI 400 is an example of the GUI 202. As shown in FIG. 4A, the GUI 400 displays a window of an expanded grouped view 402 including multiple skew groups (e.g., skew group 406, 408, 410) displayed in varying degrees of detailed view. As shown, skew group 406 is displayed in a detailed grouped view that includes a clock signal connected to at least 209 sinks, a first buffer connected to 4 sinks and a second buffer, the second buffer connected to 106 sinks, a third, and so forth. Each component of the clock tree is within the GUI 400 by a geometric shape such as a block. In some embodiments, when a portion of the skew group is selected, the selected portion is displayed in a different color to visually distinguish the selected portion from the rest of the skew group(s). As an example, FIG. 4A shows a compound skew group 406 having skew groups of 4, 106, 127, and 120 sinks converging at a node 412. In some embodiments, the skew group analysis system visually distinguishes the selected instance (e.g., node 412) by highlighting the instance in a different color. In some embodiments, each instance of a skew group can be visually distinguished from unselected components.

GUI 400 also displays a grouped view 404 of skew groups 408 and 410. Not all skew groups may be available for viewing in a detailed grouped view. In some embodiments where a skew group includes a limited number of components, a grouped and a detailed grouped view of a skew group is the same view.

FIG. 4B illustrates various views of skew groups of clock trees in accordance with some embodiments. More specifically, FIG. 4B illustrates a view of two adjacent display windows containing various views of a clock tree. Physical diagram window 422 shows a graphical representation of a physical location of a skew group component within the clock tree. Grouped view window 420 shows a graphical representation of skew groups organized in a hierarchical manner, concurrently displaying pertinent information for each of the plurality of displayed skew groups. In some embodiments, the physical diagram window 422 and grouped view window 420 are organized (e.g., viewed adjacently) to display a visual indicator that connects a physical location of a skew group component to a hierarchical view of the skew group in the grouped view. For example, arrow indicator 424 maps a physical location of skew group component 426 from the physical diagram window 422 to a hierarchical location of skew group component 426 in grouped view window 420. Other suitable visual indicators are contemplated and considered part of this disclosure. Timing window 428 provides a detailed look at the selected skew group including individual component identifiers and corresponding timing information. An optional menu 430 further provides additional functionalities for viewing information specific to one or more skew groups including, but not limited to visual demarcation (e.g., highlighting), editor, design browser, schematic view, select, collapse, and locate.

Additionally, FIG. 4B shows a compound skew group 426 including 5 individual skew groups having a respective 209, 4, 106, 127, and 120 clock sinks. A circle indicator shows that the skew groups converge at a clock node (e.g., clk/default_constraint_mode). In some embodiments, the skew group analysis system displays a location in the clock tree which the two or more skew groups converge.

Electronic Apparatus and System

Example embodiments may be implemented in digital electronic circuitry, in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry (e.g., a field-programmable gate array (FPGA) or an application-specific integrated circuit (ASIC)).

Figure 5:
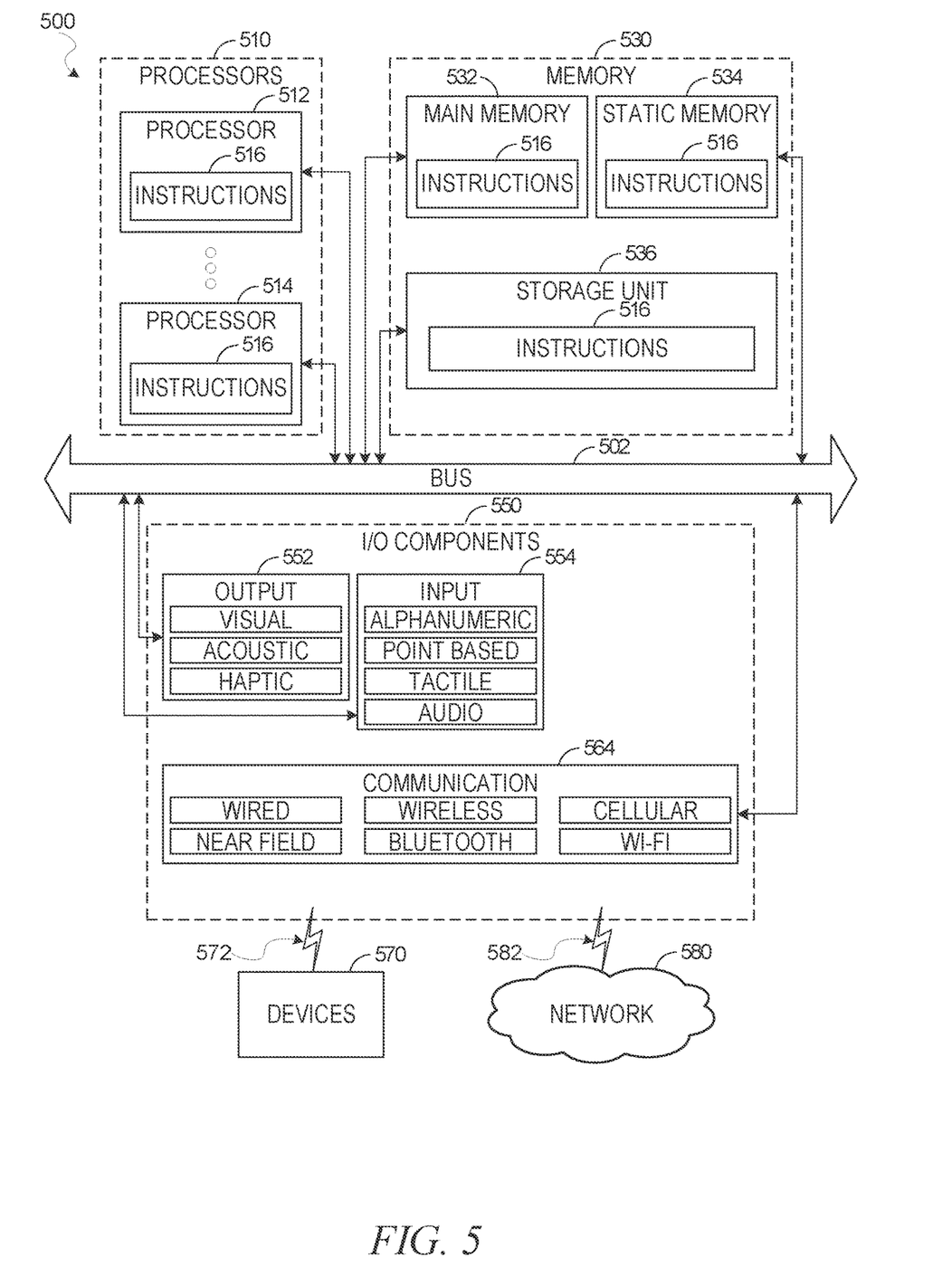
FIG. 5 is a diagrammatic representation of a machine in the example form of a computer system within which a set of instructions for causing the machine to perform any one or more of the methodologies discussed herein may be stored and executed.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 300. Additionally, or alternatively, the instructions 516 may implement FIG. 1, 2, 3A-3B, or 4A-4B. The instructions 516 transform the general, non-programmed machine 500 into a particular machine 500, such as the skew group engine 204, programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 512 and a processor 514 that may execute the instructions 516. The term "processor" is intended to include multi-core processors 510 that may comprise two or more independent processors (sometimes referred to as "cores") that may execute instructions 516 contemporaneously. Although FIG. 5 shows multiple processors, the machine 500 may include a single processor with a single core, a single processor with multiple cores (e.g., a multi-core processor), multiple processors with a single core, multiple processors with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 518 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides position and/or force of touches or touch gestures, or other tactile input components), audio input components (e.g., a microphone), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, and other communication components to provide communication via other modalities. The devices 570 may be another machine or any of a wide variety of peripheral devices (e.g., a peripheral device coupled via a universal serial bus (USB)).

Executable Instructions and Machine-Storage Medium

The various memories (e.g., 530, 532, 534, and/or memory of the processor(s) 510) and/or storage unit 536 may store one or more sets of instructions 516 and data structures (e.g., software) embodying or utilized by any one or more of the methodologies or functions described herein. These instructions 516, when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 may be transmitted or received over the network 880 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   accessing an integrated circuit design stored in memory, the integrated circuit design comprising a clock tree diagram comprising a plurality of skew groups;
   causing display, on a display device in communication with a system storing the integrated circuit design in memory, a user interface that includes a display of a grouped view of a clock-tree diagram, the grouped view comprising a graphical representation of a plurality of skew group indicators, each skew group indicator corresponding to a skew group comprising a set of clock sinks, the skew group comprises one or more of a clock gate, an inverter, or a buffer;
   receiving, via the user interface, a first user selection of a skew group indicator of the plurality of skew group indicators; and
   in response to receiving the first user selection of the skew group, updating the user interface to display a detailed view of the skew group, the detailed view of the skew group comprising a graphical representation of each clock sink in the skew group and timing information for each clock sink in the skew group.

2. The method of claim 1, the method comprising:
   receiving, via the user interface, a second user selection of a first clock sink in the skew group; and
   in response to receiving the second user selection of a first clock sink in the skew group, updating the user interface to display an indicator of a physical location of the first clock sink within the clock-tree diagram.

3. The method of claim 1, wherein updating the user interface in response to receiving the first user selection of the skew group indicator comprises:
   displaying the graphical representation of each clock sink in the skew group in a first color; and
   displaying at least one of the plurality of skew group indicators in a second color.

4. The method of claim 2, wherein the user interface of the clock-tree diagram is displayed in a first display window and updating the user interface in response to receiving the second user selection comprises:
   causing display of a second display window to display the physical location of the first clock sink within the clock-tree diagram.

5. The method of claim 4, wherein the first display window and the second display window are displayed adjacent to each other; and
   the updating of the user interface in response to receiving the second user selection comprises displaying a visual indicator connecting a physical location of the first clock sink in the second display window to the skew group in the grouped view in the first display window.

6. The method of claim 5, wherein the visual indicator is an arrow indicator.

7. The method of claim 2, further comprising:
   receiving a third user selection of two or more skew groups of the plurality of skew group indicators; and
   in response to receiving the third user selection, updating the user interface to display an expanded grouped view that includes a list of instance of two or more skew groups corresponding to the third user selection.

8. The method of claim 2, further comprising:
   receiving a third user selection of two or more skew group indicators of the plurality of skew groups; and
   in response to receiving the third user selection, updating the user interface to display an origination location for two or more skew groups within the clock tree diagram.

9. The method of claim 2, further comprising:
   receiving a third user selection of two or more skew groups of the plurality of skew groups; and
   in response to receiving the third user selection, updating the user interface to display a location in the clock tree diagram at which the two or more skew groups converge.

10. A system comprising:
one or more processors; and
a memory storing instructions that, when executed by the one or more processors, cause the system to perform operations comprising:
accessing an integrated circuit design stored in memory, the integrated circuit design comprising a clock tree diagram comprising a plurality of skew groups;
causing display, on a display device in communication with a system storing the integrated circuit design in memory, a user interface that includes a display of a grouped view of a clock-tree diagram, the grouped view comprising a graphical representation of a plurality of skew group indicators, each skew group indicator corresponding to a skew group comprising a set of clock sinks, the skew group comprises one or more of a clock gate, an inverter, or a buffer;
receiving, via the user interface, a first user selection of a skew group indicator of the plurality of skew group indicators; and
in response to receiving the first user selection of the skew group, updating the user interface to display a detailed view of the skew group, the detailed view of the skew group comprising a graphical representation of each clock sink in the skew group and timing information for each clock sink in the skew group.

11. The system of claim 10, wherein the operations comprise:
receiving, via the user interface, a second user selection of a first clock sink in the skew group; and
in response to receiving the second user selection of a first clock sink in the skew group, updating the user interface to display an indicator of a physical location of the first clock sink within the clock-tree diagram.

12. The system of claim 10, wherein updating the user interface in response to receiving the first user selection of the skew group indicator comprises:
displaying the graphical representation of each clock sink in the skew group in a first color; and
displaying at least one of the plurality of skew group indicators in a second color.

13. The system of claim 11, wherein the user interface of the clock-tree diagram is displayed in a first display window and updating the user interface in response to receiving the second user selection comprises:
causing display of a second display window to display the physical location of the first clock sink within the clock-tree diagram.

14. The system of claim 13, wherein the first display window and the second display window are displayed adjacent to each other; and
the updating of the user interface in response to receiving the second user selection comprises displaying a visual indicator connecting a physical location of the first clock sink in the second display window to the skew group in the grouped view in the first display window.

15. The system of claim 14, wherein the visual indicator is an arrow indicator.

16. The system of claim 11, wherein the operations comprise:
receiving a third user selection of two or more skew groups of the plurality of skew group indicators; and
in response to receiving the third user selection, updating the user interface to display an expanded grouped view that includes a list of instance of two or more skew groups corresponding to the third user selection.

17. The system of claim 11, wherein the operations comprise:
receiving a third user selection of two or more skew group indicators of the plurality of skew groups; and
in response to receiving the third user selection, updating the user interface to display an origination location for two or more skew groups within the clock tree diagram.

18. The system of claim 11, wherein the operations comprise:
receiving a third user selection of two or more skew groups of the plurality of skew groups; and
in response to receiving the third user selection, updating the user interface to display a location in the clock tree diagram at which the two or more skew groups converge.

19. A non-transitory computer-readable storage medium storing instructions that, when executed by one or more processors, cause the one or more processors to perform operations comprising:
accessing an integrated circuit design stored in memory, the integrated circuit design comprising a clock tree diagram comprising a plurality of skew groups;
causing display, on a display device in communication with a system storing the integrated circuit design in memory, a user interface that includes a display of a grouped view of a clock-tree diagram, the grouped view comprising a graphical representation of a plurality of skew group indicators, each skew group indicator corresponding to a skew group comprising a set of clock sinks, the skew group comprises one or more of a clock gate, an inverter, or a buffer;
receiving, via the user interface, a first user selection of a skew group indicator of the plurality of skew group indicators; and
in response to receiving the first user selection of the skew group, updating the user interface to display a detailed view of the skew group, the detailed view of the skew group comprising a graphical representation of each clock sink in the skew group and timing information for each clock sink in the skew group.

20. The non-transitory computer-readable storage medium of claim 19, wherein the operations comprise:
receiving, via the user interface, a second user selection of a first clock sink in the skew group; and
in response to receiving the second user selection of a first clock sink in the skew group, updating the user interface to display an indicator of a physical location of the first clock sink within the clock-tree diagram.

* * * * *